United States Patent Office 3,058,835
Patented Oct. 16, 1962

3,058,835
BLOOD ADHESIVE AND METHOD OF PRODUCING THE SAME
Norman J. Sheeran, Seattle, Wash., assignor, by mesne assignments, to Martin-Marietta Corporation, Chicago, Ill., a corporation of Maryland
No Drawing. Filed Jan. 19, 1959, Ser. No. 787,377
8 Claims. (Cl. 106—79)

This invention relates to an improved blood adhesive and method of producing the same and, more particularly, it relates to a protein adhesive containing animal blood. Still more particularly, it relates to alkaline adhesive compositions incorporating proteinaceous material other than animal blood, clay, and water soluble animal blood.

This application is a continuation-in-part of application Serial No. 649,758, filed April 1, 1957, now Patent No. 2,870,034, issued January 20, 1959.

The adhesive is useful in high speed laminating operations. A typical application of this adhesive is in bonding paper skins to wood veneer surfaces to produce a stiff, strong laminate, useful for box manufacture. Applications of this type require glue lines having low unit cost, rapid initial bonding, high bond strength, and high water resistance.

Low cost, quick setting laminating adhesives are known and have been used to produce box board and corrugated paper boards. These adhesives are generally based on partially cooked starch mixtures or sodium silicate solutions.

Starch or silicate base adhesives when set have little resistance to redissolving in water, hence they do not form highly water resistant glue lines. Various means for improving their water resistance have been tried, such as incorporating heat curing resins in the mix. While these improve water resistance, they generally show the cure rate of the adhesive and thereby slow the production rate of the laminated product. Such secondary additives also increase the cost thereby rendering the final adhesive mixtures less acceptable and limiting their utility.

Other laminating adhesives based on vegetable proteins have also been used. These usually consist of isolated, or fractionated proteins derived from soya beans or similar sources. These do not have the optimum of water resistance, and are also costly. The high cost arises from the complexity and low yield of the isolating and fractionating process. All-vegetable protein materials such as soya bean flour are also used for alkaline plywood adhesives. While inexpensive, these are not satisfactory in high speed laminating processes because they do not bond rapidly enough and are deficient in water resistance.

In making plywood, animal blood has long been known as a useful adhesive base material. It is normally used in highly alkaline medium, frequently in admixture with other materials such as soya flour, casein, and the like. These highly alkaline blood-base adhesives are characterized by having a high water requirement, and considerable amounts of water are therefore necessary to maintain spreadability. While of low cost, highly alkaline blood-base adhesives are not usable in high speed laminating processes because they do not form a rapid initial bond.

Additionally, high alkalinity is detrimental to sizing and can actually destroy the sizing effect. Merely lowering the alkalinity in all-vegetable protein adhesives does not overcome all the deficiencies of high alkalinity, and such low alkalinity adhesives are unsuitable for high speed laminating applications.

Preparation of highly water resistant, fast setting adhesives which could be economically competitive to the inexpensive starch or silicate type adhesives has been the subject of continuing study and a goal of adhesive research.

Many of the desirable characteristics of laminating adhesives can be supplied through the use of water soluble animal blood. Such an adhesive is described in the copending application Serial No. 649,758. Heretofore, substantial reduction of the blood content detrimentally affected important characteristics such as water resistance and bond strength, and reduction of the blood content to below 18% in wet adhesives resulted in unsatisfactory bonds.

It has now been discovered that various protein materials, other than blood itself, may be combined with water soluble blood to produce a superior alkaline laminating adhesive at substantially reduced cost. Additionally, it has been discovered that the blood content of a wet adhesive may be reduced below 18% while maintaining superior bonding qualities. These superior bonding qualities are obtained in an aqueous alkaline adhesive despite blood being present in an amount insufficient to produce a bond by itself, by combining the blood with clay and added protein materials other than blood, which alone do not have proper bonding qualities. This adhesive retains the valuable properties conferred by blood, such as rapid bonding and high water resistance.

In accordance with the invention an adhesive is prepared by forming an aqueous dispersion of water soluble blood, and an additional proteinaceous material, the same being present in quantities from about 1 part proteinaceous material to 99 parts blood to 90 parts proteinaceous material to 10 parts blood, and kaolin in an amount up to about 90% of the total protein containing materials present, the amounts of materials being expressed by wight.

A preferred adhesive is prepared by forming an aqueous dispersion of water soluble blood, the additional proteinaceous material being present in quantities between about 1 part proteinaceous material to 99 parts blood and 80 parts proteinaceous material to 20 parts blood, and kaolin in an amount up to about 60% of the total protein containing material present. The higher proportions of clay are best employed in those formulations containing the higher blood content, while the low blood formulations are best made with low clay content.

The animal bloods which are suitable in this invention are those which retain high solubility in water. These are produced by drying methods which prevent substantial denaturation of the blood. Typical of these methods are spray drying or vacuum drying which operate under conditions that avoid substantial insolubilization. Suitable results are obtained with spray dried water soluble blood having a water solubility above about 80%.

Highly denatured blood such as fertilizer blood is practically insoluble in water and normally is non-dispersible in alkalis. Water insoluble animal bloods are generally produced by drying at high temperatures. Such bloods are unsuitable as the blood component of the present invention.

Soluble blood from different sources such as beef, sheep, horses, or hogs, or mixtures of the same, are equally usable so long as they meet the water solubility requirements.

The protein materials other than animal blood employed in this invention are those generally having adhesive characteristics. Typical of these are the vegetable source proteins derived from soya beans, cotton seed, wheat, peanuts, and the like.

Animal source proteins other than blood, for example, casein, may also be used as the added protein.

Clays of the aluminum silicate type are useful in providing control and extension of the adhesive. Kaolin or china clay is particularly useful. This material in the glue insures that the essential adhesive ingredients remain at the glue line where the effective bond is obtained, and thus serves to control the degree of glue penetration into surfaces being bonded. The amount of kaolin may be varied to control flow and penetration characteristics of the adhesive, and may be adjusted according to the nature of the materials being bonded.

Incorporation of the kaolin into the adhesive is accomplished at any stage of adhesive preparation. For example, kaolin may be pre-mixed with dry blood and added protein or it may be uniformly distributed through the aqueous dispersion of proteins. The kaolin may also be added to the aqueous dispersion of proteins either before or after the dispersion is made alkaline.

A desirable laminating adhesive maintains a relatively constant viscosity over a protracted period of time. This is generally referred to as "pot life." In this invention the measurement of viscosity is accomplished at 25° C. with the McMichael (abbreviated "MM") viscometer. The cup of the viscometer rotates at 20 r.p.m.s the spindle suspended on a No. 26 wire being immersed 5 cm. below the surface of the liquid being measured. The initial viscosity of the adhesive, determined immediately after conclusion of the final mixing step, is broadly between about 10 and 150 MM units, and preferably between about 20 and about 40 MM units. Normally, viscosity will gradually increase with time. The final adhesive is usable over a wide range of viscosity being limited only by its gelation. Gelation interferes with pumping and spreading of the adhesive.

The viscosity and gelation characteristics of this adhesive are controlled by adjustment of the pH on the alkaline side. Adjustment is made by the addition of one or more alkaline compounds to either the wet dispersion or the dry adhesive mixture. The wet adhesive should have a pH between about 8 and about 11 to avoid premature gelation. As the amount of added proteinaceous material is increased in the wet adhesive it is possible to operate with a pH near 11 without danger of premature gelation. Conversely, as the soluble blood content is increased relative the other components the pH may be lowered.

The alkaline materials used may be either organic or inorganic alkalis, or various combinations thereof. Particular materials found useful are the alkali metal hydroxides, such as sodium hydroxide and potassium hydroxide, the alkali metal carbonates such as sodium carbonate, the alkali metal silicates such as sodium or potassium silicate, the alkali metal phosphates such as disodium phosphate and trisodium phosphate, and other alkaline salts. Alkaline earth metal hydroxides, such as calcium hydroxide may also be used. Ammonium hydroxide is likewise useful. Additionally various organic metal salts having an alkaline reaction, such as sodium acetate, may be used.

Non-hygroscopic alkaline compounds are preferably added to the dry ingredients. Non-hygroscopic and hygroscopic alkaline compounds may be added to the wet dispersion. Alternatively, the alkaline compounds may be first dissolved in water and the solution added to the wet dispersion. It is also possible to combine part of the alkali with the dry components and add the remainder of alkali to the wet adhesive. Such practice is useful when a combination of hygroscopic and non-hygroscopic alkali is used. Strong alkalis such as sodium hydroxide are preferably added as a dilute water solution.

Alkaline protein solutions when agitated often form a tenacious foam, detrimental to proper mixing and which interferes with the spreading and adhesion of the adhesive film. Abatement of foam may be accomplished through incorporation of pine oil or various proprietary de-foamers. These may be uniformly dispersed throughout the dry adhesive components or may be added to the wet adhesive dispersion during mixing.

Protein glue lines are occasionally subject to attack by various micro-organisms, with resulting destruction of the glue line and failure of the bond. This attack may be prevented through incorporation of small amounts of various fungicides either in the dry premix, or in the wet glue prior to completion of mixing. Typical useful fungicidal materials are the mixed sodium salts of dimethyldithiocarbamic acid and 2-mercaptobenzothiazole, or pentachlorophenol, and other related materials.

Combining of the various components to form the wet adhesive may be performed in a variety of ways. For example, the dry materials may be first thoroughly mixed to form a homogeneous mass. The liquid components such as pine oil can then be sprayed or otherwise dispersed throughout the dry ingredients. The dry adhesive base can then be mixed with water to form the wet adhesive. Alternatively, the dry components may be jointly or separately added to water with conjoint agitation to insure a lump free final dispersion.

The viscosity of the wet adhesive may be controlled by varying the water content by adjusting the same to provide an initial viscosity between about 10 to about 150 MM units, preferably between 20 and 40 MM units. The water is used at normally available temperatures, which are approximately 20°–25° C.

It is important that additional heat be avoided during glue formulation in order to avoid premature gelation of the adhesive. The glue must retain its rapid gelation characteristics so that a high speed bond will be obtained when heat is applied on the glue line.

Laminating paper-to-paper is usually performed in a continuous process whereas laminating paper-to-wood may be performed either in a continuous process or by a flat-bed pressing process.

In the continuous process the wet adhesive is spread onto the paper surface by means of adhesive spreading rollers. The laminae are then bonded by passing them between heated rolls where they are simultaneously heated and joined. Additional heated rolls cure the adhesive and form the highly water resistant bond. Paper-to-wood lamination normally occurs at 20 to 25 feet per minute, while paper-to-paper laminating is conducted at a speed of about 300 feet per minute. In flat-bed pressing the adhesive is spread either on the paper or on the veneer. The laminae are then subjected to continuous pressure during the heating. In both processes the adhesive must be capable of rapid bonding to provide a high volume production rate.

Following are examples which illustrate the invention in some of its various forms. Other variations will be apparent or occur to those skilled in the art.

EXAMPLE I

This example illustrates the production of dry adhesive base material. The following materials were mixed thoroughly in the dry state, the pine oil being sprayed into the dry mixture to insure uniform dispersion throughout the mixture.

| Material: | Parts by weight |
| --- | --- |
| Spray dried soluble blood | 31.5 |
| Soya flour | 20.0 |
| Kaolin | 46.0 |
| Pine oil | 2.0 |
| Fungicide | 0.5 |

Proportions: 1 part soya flour to 1.57 parts blood and kaolin 89.3% of the total protein-containing materials.

EXAMPLE II

This example illustrates another dry adhesive base. The mixing was accomplished as in Example I.

| Material: | Parts by weight |
|---|---|
| Spray dried soluble blood | 27.3 |
| Soya flour | 41.0 |
| Kaolin | 27.5 |
| Fungicide | 0.7 |
| Pine oil | 3.5 |

Proportions: 15 parts soya flour to 10 parts blood and kaolin 40.3% of the total protein-containing materials.

EXAMPLE III

This example illustrates the production of a wet adhesive from the dry adhesive base of Example I. The materials shown were mixed in a standard glue mixing machine equipped with paddle agitators.

| Material: | Parts by weight |
|---|---|
| Water at 23° C. | 575 |
| Dry adhesive base of Example I | 600 |
| Mix 10 minutes or until lump-free. Add | |
| Sodium silicate solution | 34 |
| Mix 10 minutes | |
| Water at 23° C. | 50 |
| Mix 5 minutes | |

In Example III the blood solids represent 15% of the wet mix, the pH of which was 9.5, and the MM viscosity being about 25.

EXAMPLE IV

This illustrates preparation of a dry adhesive base containing a dry alkaline salt.

| Material: | Parts by weight |
|---|---|
| Spray dried soluble blood | 27.3 |
| Soya flour | 41.0 |
| Kaolin | 27.5 |
| Fungicide | 0.7 |
| Trisodium phosphate | 4.5 |
| Pine oil | 3.5 |

EXAMPLE V

This illustrates the preparation of a wet adhesive from the glue base of Example IV.

| Material: | Parts by weight |
|---|---|
| Water at 23° C. | 500 |
| Dry adhesive base of Example IV | 300 |
| Mix 20 minutes or until lump-free | |

The initial MM viscosity of the above adhesive was 17. The pH of the wet adhesive was 9.7, the blood solids represent 9.9% of the wet mix.

EXAMPLE VI

This example illustrates the preparation of the wet adhesive by admixing the individual dry ingredients in water, with subsequent adjustment of the pH.

| Material: | Parts by weight |
|---|---|
| Water at 20°–25° C. | 600 |
| Pine oil | 12 |
| Spray dried soluble blood | 189 |
| Kaolin | 276 |
| Wheat flour | 120 |
| Fungicide | 3 |
| Mix the above 10 minutes or until lump-free | |
| Sodium silicate solution | 35 |
| Mix 5 minutes | |
| Water at 20°–25° C. | 250 |
| Mix 5 minutes | |

1 part wheat flour was added to 1.58 parts blood and kaolin was 89.3% of the total protein-containing material.

The final wet adhesive had a pH of 9.7 and an initial MM viscosity of 32. The blood represents 12.7% of the wet adhesive weight.

EXAMPLE VII

This example illustrates the use of casein as the added protein, and the adjustment of the pH with a dilute solution of sodium hydroxide. A dry mix containing part of the alkali was prepared by mixing the following together until uniformly blended.

Part A

| Material: | Parts by weight |
|---|---|
| Spray dried soluble blood | 82 |
| Casein | 123 |
| Kaolin | 82 |
| Fungicide | 2 |
| Trisodium phosphate | 36 |
| Pine oil | 12 |

Proportions: 15 parts casein to 10 parts blood and kaolin was 40% of the total protein-containing materials.

Part B

A wet mix was made as follows.

| Material: | Parts by weight |
|---|---|
| Water at 20°–25° C. | 600 |
| Dry mix of Part A | 337 |
| Mix 15 minutes | |
| Water at 20°–25° C. | 300 |
| Mix 10 minutes | |
| Sodium hydroxide solution (8.25% in water) | 25 |
| Mix 5 minutes | |

The final pH was 10.5, while the initial MM viscosity was 55. The blood solids in the wet adhesive were 6.5%.

EXAMPLE VIII

This example illustrates the use of an alkaline earth hydroxide to provide the alkaline pH. The following wet adhesive was prepared.

| Material: | Parts by weight |
|---|---|
| Water at 20°–25° C. | 350 |
| Dry adhesive base of Example II | 250 |
| Mix 10 minutes | |
| $Ca(OH)_2$ | 3 |
| Mixed in | |
| Water | 25 |
| Mix 5 minutes | |
| Water at 20°–25° C. | 50 |
| Mix 5 minutes | |

The initial MM viscosity of the wet adhesive was 30, the pH was 10.8. The blood solids were 10.1% of the wet adhesive.

EXAMPLE IX

This example illustrates the use of an organic quaternary ammonium compound to provide the required alkaline pH.

| Material: | Parts by weight |
|---|---|
| Water at 20°–25° C. | 325 |
| Dry adhesive base of Example II | 250 |
| Tetraethanol ammonium hydroxide (10% in water) | 38 |
| Mix 10 minutes | |
| Water at 20°–25° C. | 75 |

The initial MM viscosity of the wet adhesive was 30. The pH was 9.9. The blood solids were 9.9% of the wet adhesive.

EXAMPLE X

This example illustrates the preparation of a wet adhesive from the dry adhesive base of Example II. The materials shown were mixed in a paddle type mixer.

Material: Parts by weight
- Water at 20°–25° C. _____ 490
- Dry base of Example II _____ 400
  Mix 15 minutes
- Water at 20°–25° C. _____ 90
  Mix 3 minutes
- Sodium silicate solution _____ 31
  Mix 5 minutes
- Water at 20°–25° C. _____ 135
  Mix 5 minutes The initial MM viscosity of the wet adhesive was between about 10 and 40. The pH was between about 8 and 11.

EXAMPLE XI

This example illustrates a glue mix having a high proportion of water soluble blood to added proteinaceous material.

Material: Parts by weight
- Spray dried soluble blood _____ 300.0
- Soya flour _____ 3.1
- Kaolin _____ 270
- Pine oil _____ 12

Proportions: 96.8 parts blood to 1 part soya flour and kaolin is 89.2%.

This glue mix may be compounded into a wet adhesive in a manner analogous to the procedure set forth in Example III.

The quality of the adhesive bond produced by the wet adhesives according to this invention were tested by the flat bed pressing technique described as follows:

The wet adhesive was uniformly spread on one side of an 8 inch by 10 inch piece of 42 pound kraft linerboard at the rate of 4 grams of wet glue per 80 square inches of surface.

The linerboard was then placed on the surface of a ⅛ inch thick piece of 8 inch by 10 inch Douglas fir veneer with the adhesive in contact with the veneer surface. Then the assembly was placed in a flat-bed hot-press, the press was closed to provide a pressure of 133 p.s.i. on the panel surface, with the platens of the press being at a temperature of 250° F. The time of pressing was counted from the time the press reached full pressure.

Upon expiration of the desired press time the laminate was immediately removed from the press and the initial bond evaluated by attempting to manually separate the linerboard from the veneer. The bond quality was estimated from the manual force required to separate the pieces, and from the amount of fiber visible on the separated surfaces.

The following rating system was applied to each bond:

O—No bond whatsoever; assembly delaminated immediately on removal of press pressure.

VP—Specimen held together when pressure removed; adhesive bond is shallow and brittle; paper easily separates from wood; no wood fiber or paper failure visible.

P—Very slight adhesion; separation of paper from wood requires slight force; no wood or paper failure visible.

PF—More force required than for specimens graded P to separate paper from the wood; no wood or paper failure visible.

F—Moderate force required to separate paper from wood; no wood or paper failure.

FG—Force required to separate paper from wood moderately increased over F rating; some slight paper failure obtained in small areas on test specimens.

G—Substantial force required to separate paper from wood; definite paper failure obtained over at least 50% of the glued area.

VG—All specimens show tight high quality bonds; strong force required to separate from the wood same as for G rating but paper failure noted over 100% of the glued area.

The final bond of the laminate was evaluated by attempting to manually separate the linerboard from the veneer after the laminate had cooled to approximately room temperature, and the same rating system was applied.

Following are the rating results achieved by specific wet adhesive formulations:

TABLE I

The wet adhesive of Example V was tested as above.

| Press time | Pressure on Panel, p.s.i. | Initial Bond | Final Bond |
| --- | --- | --- | --- |
| 8 sec | 133 | F-G | VG |
| 12 sec | 133 | G | VG |

The wet adhesive of Example VI was tested with the following results:

| | | | |
| --- | --- | --- | --- |
| 20 sec | 112 | G | G |

The wet adhesive of Example VII was tested with the following results:

| | | | |
| --- | --- | --- | --- |
| 8 sec | 133 | FG-G | G |
| 12 sec | 133 | G | G |

The wet adhesive of Example VIII was tested with the following results:

| | | | |
| --- | --- | --- | --- |
| 8 sec | 133 | G | VG |
| 12 sec | 133 | VG | VG |

The wet adhesive of Example IX was tested as above.

| | | | |
| --- | --- | --- | --- |
| 8 sec | 133 | FG | VG |
| 12 sec | 133 | G | VG |

It will be seen from Examples I–X that practical heat-settable laminating adhesives can be prepared from substantially undenatured dry water soluble blood in amounts less than 18% of the wet adhesive weight, added proteinaceous material from a source other than blood, kaolin, alkaline material, and water. This may be accomplished by dispersing the proteinaceous ingredients in water at blood to added proteinaceous material ratios between about 10:15 and about 15:10 in the presence of between about 40% and about 90% kaolin, based on the weight of the protein-containing materials, and including in the dispersion alkaline material in an amount to produce a pH between about 8 and about 11, and water in an amount to produce an initial MM viscosity between about 10 and about 150 units.

The formation of the wet adhesive is effected without substantial addition of heat to avoid heat-denaturation of the protein-containing materials and to thus avoid premature gelation and setting of the adhesive. The avoidance of heat insures the production of a spreadable adhesive which has a tendency to set as soon as heat is applied.

The use of added proteinaceous material from a source other than blood with water soluble blood permits adjustment of the pH upward to about pH 11 but without causing premature gelation of the adhesive. Adhesive of this invention with the higher pH values mentioned are very responsive to heat and rapidly set and bond when subjected to heat.

An important advantage of the use of kaolin or china clay is to provide control of the adhesive as to its behavior in the glue line. The kaolin controls the adhesive in the glue line by retaining the adhesive components on the glue line where the effective bond is produced. In addition the kaolin extends and bodies the adhesive and reduces adhesive costs.

The adhesive of Examples XI–XIII demonstrate that a broad range of blood to added proteinaceous material from a source other than blood, i.e. 99:1 to about 10:90, is operable under the recited conditions of viscosity and pH.

The invention is claimed as follows:

1. A dry adhesive base composition productive of an aqueous-alkaline dispersion, consisting essentially of: substantially undenatured, dry water-soluble blood protein; added proteinaceous material from a source other than blood selected from the group consisting of proteins derived from soya beans, cotton seed, wheat, peanuts and casein, and mixtures thereof; kaolin; and a non-hygroscopic alkaline material; said protein-containing materials being in the ratios between about 90:10 and about 10:90 blood to added proteinaceous material; said kaolin being present in an amount between about 90% and about 10% of the total protein-containing materials; and said alkaline material being in an amount to produce in the dispersion a pH between about 8 and about 11.

2. The dry adhesive base according to claim 1 in which the ratios of protein-containing materials are between 10:15 and 15:10 blood to added proteinaceous material.

3. The dry adhesive base according to claim 1 in which the non-hygroscopic alkaline materials are selected from the group consisting of sodium, potassium and lithium carbonates; di- and tri-sodium, di- and tri-potassium and di- and tri-lithium phosphates; sodium, potassium and lithium silicates; and mixtures thereof.

4. In the preparation of a heat settable adhesive, consisting essentially of: substantially undenatured, dried water-soluble blood protein; added proteinaceous material from a source other than blood selected from the group consisting of proteins derived from soya beans, cotton seed, wheat, peanuts, and casein, and mixtures thereof; kaolin; alkaline material; and water; the method comprising: mixing said ingredients into a homogeneous mass, said proteinaceous material being in the ratios between about 90:10 and about 10:90 blood to added proteinaceous material; said kaolin being present in an amount between about 90% and about 10% of the total protein-containing materials, said alkaline material being present in an amount to produce a pH between about 8 and about 11, said water being present in the homogeneous mass to produce an initial MM viscosity between about 10 and about 150, said mixing being performed without substantial addition of heat to avoid uncontrollable gelation.

5. The wet adhesive product of claim 4.

6. The method according to claim 4 in which the ratios of proteinaceous materials are between 10:15 and 15:10 blood to added proteinaceous materials.

7. The method according to claim 4 in which the alkaline material is an alkaline alkali metal salt.

8. In the preparation of a heat settable adhesive consisting essentially of dried water-soluble blood, soya flour as added proteinaceous material, kaolin, alkaline alkali metal salt, and water; the method comprising: blending together in the dry state and mixing into a homogeneous mass, about 15 parts added proteinaceous material to about 10 parts of blood, and kaolin in an amount, based on the protein-containing materials, equivalent to about 90%, dispersing said dry blended materials in water and mixing to a lump-free condition; dispersing therein said alkaline material in the form of sodium silicate solution in an amount to produce a pH between about 8 and about 11, water being present in an amount to produce an initial MM viscosity between about 10 and about 150; all of said operations being effected without substantial addition of heat to avoid uncontrollable gelation.

References Cited in the file of this patent

UNITED STATES PATENTS

| | | |
|---|---|---|
| Re. 24,881 | Sheeran | Sept. 27, 1960 |
| 2,530,780 | Peterson et al. | Nov. 21, 1950 |
| 2,705,680 | Jarvi | Apr. 5, 1955 |
| 2,870,034 | Sheeran | Jan. 20, 1959 |